April 18, 1961  F. SCHLUMBERGER  2,980,206
GAS SCRUBBER
Filed Nov. 13, 1959  2 Sheets-Sheet 1

Inventor:
François Schlumberger
By Robert Henderson
Attorney

April 18, 1961   F. SCHLUMBERGER   2,980,206
GAS SCRUBBER

Filed Nov. 13, 1959   2 Sheets-Sheet 2

Inventor:
François Schlumberger
By Robert Henderson
Attorney 2,980,206
GAS SCRUBBER Francois Schlumberger, Chaville, France, assignor to Compagnie de Construction de Gros Materiel Electro-Mecanique, Paris, France, a company of France Filed Nov. 13, 1959, Ser. No. 852,753
Claims priority, application France Dec. 15, 1958
8 Claims. (Cl. 183—52)

This invention relates to gas scrubbing, filtering, or purifying systems of the type comprising a gas filter screen in the form of an endless loop of filtering material against a flight of which a stream of gas to be cleaned is directed so that dirt particles are deposited on the filtering material whereas the gas is allowed to pass through, and wherein the lower end of this endless filter screen dips into a body of cleaning liquid, e.g. oil, so that on continuous displacement of the filter screen around its looped path the dirt-laden filter material is continuously passed through the liquid so as to be cleaned, or regenerated, therein.

In present scrubbers of this type, it is found that only a fraction of the dirt deposited on the filter material from the gas is actually removed by the cleaning liquid as the material passes therethrough at the bottom end of its looped path of motion, while a substantial amount of dirt particles is retained, thereby seriously impairing the efficiency of the filtering or scrubbing process.

It is the object of this invention to provide a gas scrubber of the type specified, wherein the efficiency of dirt removal from the filter material and hence the over-all efficiency of the system, will be considerably enhanced.

According to an aspect of the invention, there is provided in a gas scrubber of the general type specified at the lower end of the endless filter loop, a vane structure driven in rotation together with said endless loop and so arranged that the vanes thereof will engage the filter material in the area thereof moving through the liquid, so as to define temporarily therewith one or more part-sealed bucket-like chambers that will scoop up liquid from the tank. Subsequently the liquid from each chamber will drain off by gravity through the filter material thereby efficiently removing the dirt particles adhering to the surface of the material, as each successive bucket is lifted clear of the liquid.

Another object of this invention is to provide improved means for discharging accumulated dirt from the cleaning-liquid tank of a gas scrubber of the type described. This object is achieved by providing a screw type conveyer having a part extending in the tank and an outer end part extending upwardly out of the tank, and rotating this conveyer at a predetermined slow rate such as to permit substantial sedimentation of the dirt from the liquid within the screw conveyer prior to discharge at the outer end thereof.

The above and further objects, features and advantages of the invention will appear as the description proceeds with reference to a specific embodiment of the invention selected by way of illustration but not of limitation.

Figure 1:
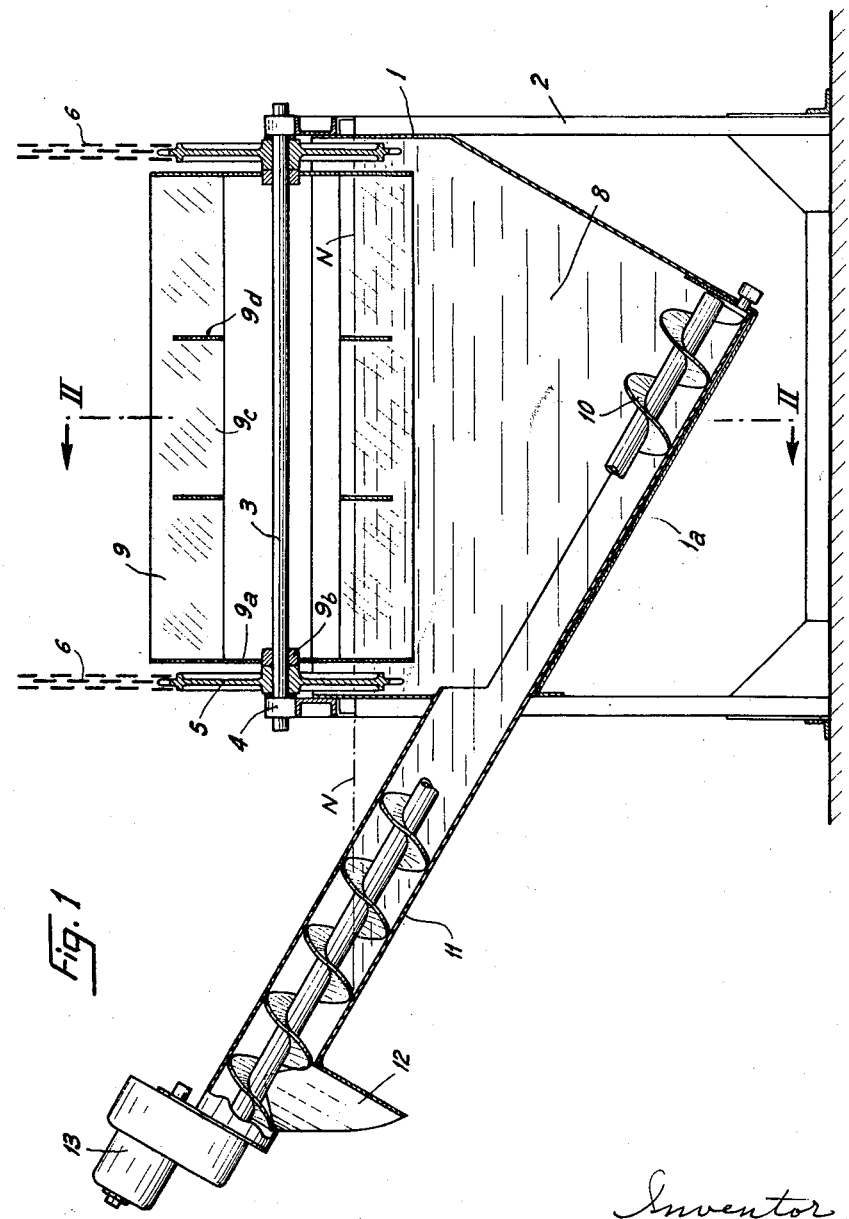
Fig. 1 is a vertical sectional view of the lower part of a scrubber system according to the invention.

As shown, an air scrubber or filter system comprises a tank 1 supported on a frame 2 and adapted to contain a body of cleaning liquid such as oil 8. Journalled in bearings 4 in the frame 2 is a shaft 3 extending horizontally a short distance above the tank. Secured to both ends of the shaft 3 outside the sides of the tank are respective sprocket gears 5 around which are trained the lower ends of a pair of endless sprocket chains 6 which, at their upper ends, are trained about similar sprocket gears not shown. Secured across the pair of chains 6 by means of supports 7a are a plurality of filter plates 7, as shown in Fig. 2.

The arrangement is such that throughout the rectilinear sections or flights of the chains 6, the plates 7 cooperate to define continuous filtering surfaces. However, over the arcuate sections of the chains where these pass around the end sprocket gears 5, the plates open out as clearly shown in Fig. 2.

Secured on the shaft 3 between the end sprockets 5 and within the tank, is a vaned rotor structure generally designated 9 and comprising the pair of spaced side flanges 9a having their hubs 9b secured on the shaft. A plurality of angularly equispaced radially extending vanes 9c, herein six in number, have their ends secured to the respective flanges 9a, with the radially inner longitudinal sides of these vanes being spaced from the shaft 3. Adjacent ones of the vanes 9c are interconnected by a number of spacer plates such as 9d, there being provided in this example two spacers 9d between each adjacent pair of vanes 9c, axially or longitudinally spaced thereon as will be apparent from Fig. 1.

Figure 2:
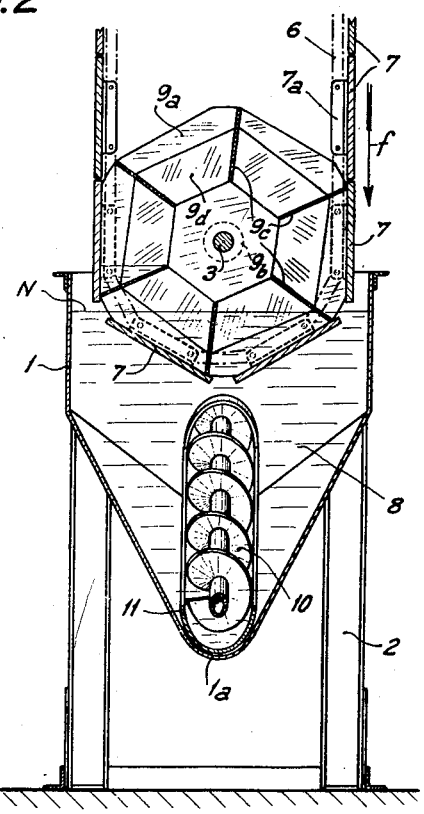
Fig. 2 is a section on line II—II of Fig. 1.
Figure 3:
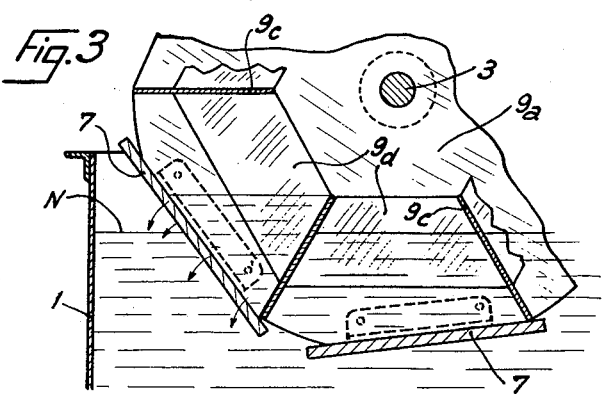
Fig. 3 is a simplified view of part of Fig. 2 drawn to a larger scale, for illustrating the operation of the buckets.

As clearly shown in Fig. 2, the arrangement is such that the angle defined between each consecutive pair of adjacent radial vanes 9c is substantially equal to the center angle defined by the radii extending from the axis of shaft 3 to the midpoints of each consecutive pair of adjacent plates 7, in the area wherein these plates are passing around the sprocket gears 5. In the instant embodiment this common angle is equal to 60° and the rotor accordingly comprises six radial vanes as mentioned above. Furthermore, the relative angular setting and dimensioning are such that in the aforementioned area, each of the radial vanes 9c is adapted to engage a filter plate 7 at a point adjacent the trailing end of the latter, in terms of the direction of movement of the plates as indicated by the arrow $f$ in Fig. 2. In addition, the end flanges 9a of the rotor are so dimensioned and contoured, somewhat in the form of a hexagon with rounded corners, see Fig. 2, that the peripheral edge of each end flange will engage the inner surface of each plate 7 over a substantial portion of its length beginning at the point of engagement therewith of the vanes 9c near the trailing edge of said plate as just mentioned. As a result of these arrangements it will be seen that the end flanges 9a will participate with each radial vane 9c and with a filter plate 7 to define a bucket structure that is substantially completely enclosed except for a relatively small gap beyond the leading edge of the filter plate, so that in operation each such bucket will act to scoop up an amount of oil through this gap and lift this oil out of the tank. As the bucket proceeds in its clockwise rotation, the oil filling it will drain out through the perforations in the plate 7 and fall back into the tank 1, as shown in Fig. 3, thereby carrying with it most of the dirt particles that have accumulated in the filter plates.

It will be understood that in operation, a stream of air or other gas to be scrubbed flows past the vertical flights of the moving filter screen, e.g. from the right side as seen in Fig. 2, and that the dirt particles suspended in the gas are deposited usually on the outer surfaces of the filter plates 7 as the gas flows threrethrough, thereby scrubbing the gas clean. Therefore, the scoop bucket action provided by the invention as just described, according to which oil is made to flow positively from the inside of a bucket outwards, i.e. from the inner to the outer surface through each plate 7, is highly efficient in scrubbing each plate clean in succession since the dirt particles deposited on the outer surfaces of the plates are thereby easily carried away.

Improved means are provided for removing the dirt accumulating in the tank 1, and for this purpose an inclined gutter 1a is shown formed in the bottom of the tank, the gutter having a part-circular cross section and receiving therein a screw conveyer 10. The screw conveyer extends upwardly out of the tank in a pipe 11, the arrangement being for example such that about two consecutive turns of the screw are positioned above the free level N of the oil in the tank. The upper end of the pipe 11 is connected with a dirt discharge chute 12. Advantageously the screw is driven in rotation at a very slow rate, e.g. a few revolutions per hour, so that the dirt suspended in the oil has the opportunity of undergoing an efficient settling action in the spaces defined between the pipe and the screw and is removed and discharged through chute 12, while the clean oil is left behind in the pipe 11. For this purpose Fig. 1 shows a high-ratio reducer gearing coupled with the upper end of the screw and driven e.g. from an electric motor 13.

It will be understood that the single embodiment of the invention herein described and illustrated is given for purposes of illustration but not of limitation, since various modifications may be made therein while still following the teachings of the invention.

What I claim is:

1. A gas scrubbing system comprising in combination means defining an endless loop of filtering material, said loop including a generally vertical rectilinear flight and an arcuate bottom end, a container for a body of cleaning liquid, means supporting said loop in a position such that said rectilinear flight thereof is traversed by a flow of gas to be scrubbed so as to deposit dirt particles on said filtering material and that said bottom end thereof dips into said body of liquid, power means driving said loop so that dirt-laden filtering material from said flight is continuously moving through said container at said bottom end of the loop, and means within said bottom end of the loop, temporarily defining with a portion of the filtering material passing through said container, a partly enclosed chamber adapted to scoop up liquid during movement of said material through said container, and said chamber being adapted to subsequently discharge its contents by gravity through said material as the chamber rises out of the container on continued movement of said material whereby to clean the material of the dirt deposited thereon.

2. A gas scrubbing system comprising means defining an endless band of filter material including an upstanding straight flight and an arcuate bottom end, a container for a body of cleaning liquid, means supporting the band such that said straight flight thereof is traversed by gas to be scrubbed so as to deposit dirt on an outer side of said filter material and that said bottom end dips into said liquid, power means driving the band so that dirt-laden material is continuously moving through said liquid, and rotatable means in the container driven together with said band and cooperating therewith temporarily to define with the inner side of a portion of material moving through said liquid at least one partly enclosed space adapted to scoop up liquid and then allow the liquid to drain out through said filter material whereby to clean the latter of the dirt deposited on the outer side thereof.

3. A gas scrubber comprising an endless loop of filter material and means including a rotatable bottom end sheave structure for supporting said loop such that a rectilinear flight thereof is traversed by gas to be scrubbed so as to deposit dirt on an outer surface of said material, a container for cleaning liquid positioned to have said sheave structure dipping therein, means for rotating said sheave structure to move said loop through the liquid, and vane means in and rotatable with the sheave structure supported for temporary engagement with the inner surface of the filter material and temporarily defining therewith at least one part-sealed bucket-like enclosure for scooping up liquid from the container for cleaning the filter material.

4. A gas scrubber comprising endless band means and a plurality of filter plates supported thereon in side-by-side relation, supporting means including a rotatable bottom sheave assembly for supporting said endless band to provide a straight flight thereof wherein said plates define a substantially continuous flat filter screen adapted to be traversed by said gas to deposit dirt on surfaces of said plates, a container for cleaning liquid positioned to have the sheave assembly dipping therein, means for rotating the sheave assembly to advance said plates through the liquid, and generally radial, angularly spaced vanes supported by the sheave assembly for temporary engagement of outer ends of the vanes with surfaces of respective ones of said filter plates to define therewith partly-sealed bucket-like chambers for scooping up liquid to clean the plates.

5. In the scrubber claimed in claim 4, spaced end flanges in said sheave structure cooperating with said vanes and plates to define said bucket-like chambers.

6. A gas scrubber comprising a frame, a horizontal shaft supported for rotation in the frame, a pair of spaced wheels on the shaft, a pair of endless flexible elements having lower ends trained around said wheels and having means supporting the upper ends thereof to define a pair of parallel spaced upwardly extending endless loops having generally vertical, straight, flights, a plurality of filter plates supported across said pair of endless elements to define a flat continuous filter screen in a straight flight of the endless loops, means discharging a stream of gas to be scrubbed against a side of said screen, a container for cleaning liquid arranged to have said wheels and the lower ends of said elements dip therein, means rotating the shaft to advance said plates through the liquid, a pair of spaced side flanges supported on said shaft between said wheels, and a set of angularly equispaced, generally radial vanes on the shaft positioned for temporary engagement of outer ends thereof with successive ones of said plates to participate therewith and with said flanges in defining a number of part-sealed bucket-like enclosures for scooping up liquid to clean said plates.

7. In the gas scrubber claimed in claim 2, a screw conveyor in said container for removing accumulated dirt therefrom.

8. A gas scrubbing system comprising in combination means defining an endless loop of filtering material, said loop including a generally vertical rectilinear flight and an arcuate bottom end, a container for a body of cleaning liquid, means supporting said loop in a position such that said rectilinear flight thereof is traversed by a flow of gas to be scrubbed so as to deposit dirt particles on said filtering material and that said bottom end thereof dips into said body of liquid, power means driving said loop so that dirt-laden filtering material from said flight is continuously moving through said container at said bottom end of the loop, and means movable with said filtering material and defining, with a portion of the latter passing through said container, a scoop adapted to pick up cleaning liquid from said container and discharge the picked-up liquid through said filtering material as the scoop emerges from the body of liquid in said container.

References Cited in the file of this patent

UNITED STATES PATENTS

| 1,690,813 | Birkholz | Nov. 6, 1928 |
| 1,843,182 | Strindberg | Feb. 2, 1932 |
| 1,895,601 | Beuthner | Jan. 31, 1933 |

FOREIGN PATENTS

| 7,977 | Great Britain | Apr. 22, 1895 |
| 278,175 | Great Britain | Oct. 6, 1927 |
| 571,790 | Germany | Mar. 6, 1933 |